United States Patent
Clemm et al.

(10) Patent No.: US 7,865,877 B2
(45) Date of Patent: Jan. 4, 2011

(54) COMPUTER METHOD AND APPARATUS FOR REFERENCING FILES IN A SOFTWARE CONFIGURATION MANAGEMENT SYSTEM

(75) Inventors: Geoffrey M. Clemm, Concord, MA (US); Dale M. LaBossiere, Westford, MA (US); Todd W. Lainhart, Harvard, MA (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/610,178

(22) Filed: Dec. 13, 2006

(65) Prior Publication Data

US 2008/0148233 A1 Jun. 19, 2008

(51) Int. Cl.
*G06F 9/44* (2006.01)
*G06F 7/00* (2006.01)

(52) U.S. Cl. .................................. 717/121; 707/638
(58) Field of Classification Search ................ 717/121; 707/638
See application file for complete search history.

(56) References Cited

U.S. PATENT DOCUMENTS

| | | | |
|---|---|---|---|
| 6,061,743 A | 5/2000 | Thatcher et al. | |
| 6,256,773 B1 * | 7/2001 | Bowman-Amuah | 717/121 |
| 6,523,027 B1 * | 2/2003 | Underwood | 1/1 |
| 6,859,812 B1 | 2/2005 | Poyner | |
| 2002/0143795 A1 | 10/2002 | Fletcher et al. | |
| 2003/0158871 A1 * | 8/2003 | Fomenko | 707/203 |
| 2005/0235012 A1 | 10/2005 | Harry et al. | |

OTHER PUBLICATIONS

Jones, "Software Configuration Management for the Web", Winter 2000, "Methods and Tools", pp. 1-6.*

* cited by examiner

*Primary Examiner*—Wei Y Zhen
*Assistant Examiner*—Chih-Ching Chow
(74) *Attorney, Agent, or Firm*—Hamilton, Brook, Smith & Reynolds, P.C.

(57) ABSTRACT

A software configuration management method and apparatus provide a respective workspace for each developer. Each workspace (i) defines a subject software configuration as being developed by the respective developer, and (ii) has a respective file area holding shared files and private files corresponding to the subject software configuration. A team repository holds immutable versions of shared files resulting from developers' respective workspaces and checked into the team repository. The team repository also provides state of checked-in files of developer workspaces. Files are referenced with respect to both namespace of file areas of developer workspaces and namespace of the team repository. Employed in each file area are universally unique identifiers of at least each file of the file area which has been checked in to the team repository.

12 Claims, 4 Drawing Sheets

COMPUTER METHOD AND APPARATUS FOR REFERENCING FILES IN A SOFTWARE CONFIGURATION MANAGEMENT SYSTEM

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software configuration management system is one such tool. Software configuration management systems allow teams of users (software developer/engineer) to work with artifacts of a subject software system.

A software artifact is a persistent representation of an aspect of a software system. Common examples of software artifacts are files and directories containing the source code of a software system, but other examples of artifacts include requirements, end-user documentation, system models, and system tests. A significant state of a software artifact is saved as a version of that artifact, and the sets of versions of a given artifact define the history of that artifact.

A software configuration is a set of software artifact versions, where only one version of a given artifact is selected by a given software configuration. A software change-set identifies a logical change to a configuration, and consists of a set of one or more changes to one or more artifacts. An alternative characterization of a software configuration is that it consists of the set of change-sets that have resulted in that configuration.

When a team of software developers is creating and modifying files to create new configurations of a software system, each developer needs to have a private copy of the files so that he can test his changes without being disrupted by changes being made by the other developers. The object that maintains a private copy for a particular developer is called a workspace, and the files for a workspace are stored in a file system tree that is called the file area of the workspace. The file area contains both shared files (that are shared with the other members of the team) and private files (that are available only in that file area). To support disconnected use, the file area is stored on the local disk on the developer's machine. When a developer is ready to make his changes available to other team members, he checks in any shared files and folders he has changed in his file area, which creates an immutable version of those files and folders in a team repository.

It is often important for a developer to be able to inspect the state of the files in another developer's workspace. The most current state of a file is in the file area of that workspace (for example, the current state of files being modified is usually only available in the file area), but the file area of a developer's workspace is commonly inaccessible to most other developers (especially if the owner of the workspace is working disconnected). A good approximation of the state of the files in a workspace usually can be obtained from the checked-in state of those files, and that state is available to any developer that has access to the team repository. This means that there are two different naming trees that can be used to obtain the state of files in a workspace: the file area naming tree (file pathnames) and the repository naming tree (repository pathnames). The file referencing mechanism must allow a developer to specify which namespace they want to use (since the actual states of files in these two namespaces can differ), but to avoid unnecessary complexity, the mechanisms for accessing files in these two namespaces should be as uniform as possible. In particular, it should be feasible for the system to automatically transform a file area reference into a repository reference, and vice versa. In particular, if a developer has a reference to a file in the file naming tree of another developer, the system should be able to automatically convert that reference into a reference to the checked-in state of that file in the repository, so that it can give the developer the option of browsing the checked-in state instead. Conversely, if a developer has a reference to a file in the repository, and that file area for that file is on the developer's machine, the system should be able to automatically convert that repository reference into a reference to the corresponding file in the file area, even if the developer is currently disconnected from the repository.

When a developer uses a reference, it is important for the system to be able to detect whether the state of the file being referenced has changed since the reference was created.

One complication that can arise is that a file in the file area may have been renamed or moved in the file area, but the modified folders that capture the new location of that file have not yet been checked in to the repository.

SUMMARY OF THE INVENTION

The present invention addresses the problems of the prior art. In particular, the present invention provides a method and apparatus for referencing files in potentially disconnected software development workspaces. The invention method and apparatus include a software configuration management system comprising:

a respective workspace for each developer, each workspace (i) defining a subject software configuration as being developed by the respective developer, and (ii) having a respective file area holding at least shared files corresponding to the subject software configuration; and a team repository holding immutable versions of checked-in shared files resulting from developers' respective workspaces. The team repository may further provide state of checked-in files of developer workspaces.

In some embodiments, the file area of developer workspaces hold any combination of shared files and private files.

In a preferred embodiment, a reference to a file or folder in a workspace is captured as a special class of object called a WSReference. A WSReference contains the following fields:

IsFileAreaReference: a flag indicating whether it is a reference to the state in the file area or the state in the repository.

UUID: a universally unique identifier of a file or folder

WorkspaceUUID: a universally unique identifier of a workspace

State: either a version UUID or a modification date

Suffix: a pathname suffix for private file area files that have no UUID

A registry is maintained on each client machine containing entries for each workspace that has a file area in that machine. Each entry contains the UUID of the workspace and the pathname to the root folder of the file area of that Workspace. A copy of the workspace registry of each client machine is maintained in the team repository.

In each folder in the file area of a workspace, a special UUID-file is maintained with the UUID of each member (file or folder) of that folder that has been checked-in to the team repository. In addition, the UUID of the Version of a checked in file is stored, as well as easily computed identity information that can be used to identify a file or folder, such as creation date and size, is stored with the UUID. The information is stored in this form so that the UUID and Version information is not lost when standard file system operations are used to move folders or rename files within a folder.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1a illustrates the server side and FIG. 1b illustrates the client.

DETAILED DESCRIPTION OF THE INVENTION

A description of example embodiments of the invention follows.

Figure 1A:
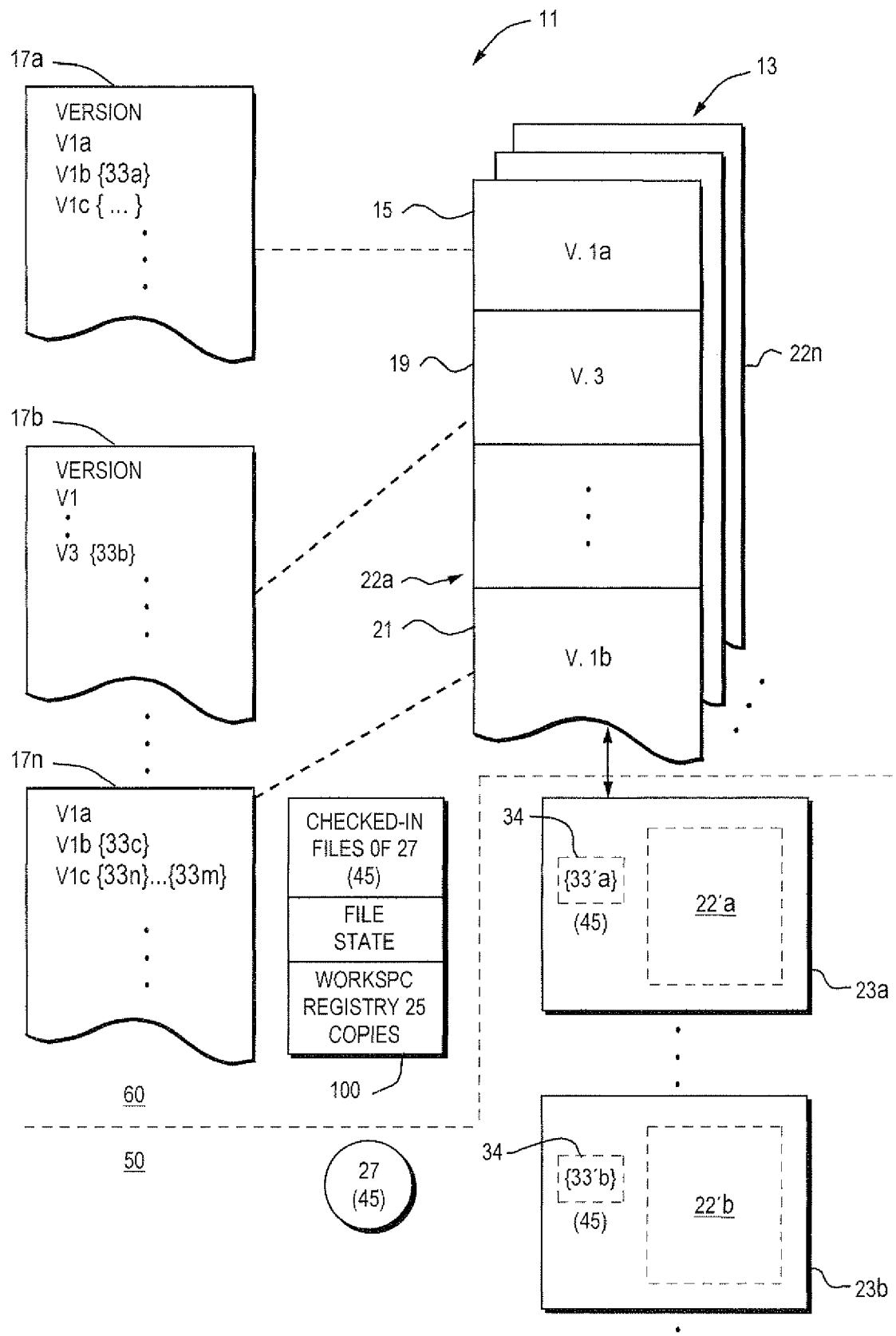
FIGS. 1a-1b are schematic views of a computer software configuration management system embodying the present invention, where

Illustrated in FIG. 1a is a configuration management system 11 embodying the present invention. Configuration management system 11 provides a workspace view of a subject software program 13 and various information regarding the subject software program 13. The software program 13 is formed of one or more artifacts 15, 19, 21. Each artifact 15, 19, 21 has respective versions, e.g., V.1a, V.3, V.1b, etc. Each configuration 22 of a subject software program 13 employs respective versions of the artifacts 15, 19, 21. One of the illustrated configurations 22 of subject software program 13 in FIG. 1 is formed of version V.1a of artifact 15, version V.3 of artifact 19 and version V.1b of artifact 21. Other configurations 22 of subject software program 13 use other versions of artifacts 15, 19, 21.

Information regarding the versions of an artifact 15, 19, 21 is stored in a respective version history table of the artifact 15, 19, 21. In particular, change set information (the change set 33 to which a version belongs) is recorded in respective artifact version history table 17. FIG. 1a illustrates the one configuration 22 of subject software program 13 having version history table entry 17a for artifact 15, version history table entry 17b for artifact 19 and version history table entry 17n for artifact 21. It is understood that the configuration management system 11 stores the foregoing information for each configuration 22 of program 13.

Configuration management system 11 enables developers to produce and work with (edit, test, redesign, etc.) such different configurations 22 of subject software program 13. Each artifact 15, 19, 21 is a persistent result of work done by a developer, typically persisted in a file system such as models and source code. An "activity" is used to track the results of work done by a user (developer). The "change set" 33 of an activity is the set of changes to artifacts 15, 19, 21 made by the developer to perform the activity. A "workspace" 23 is used to define the work environment of a developer—to contain the artifacts 15, 19, 21 required by that developer and the change sets that track the results of performing those activities. The workspace 23 is said to "accept" the activity change sets that define the current or working configuration 22'.

Figure 1B:
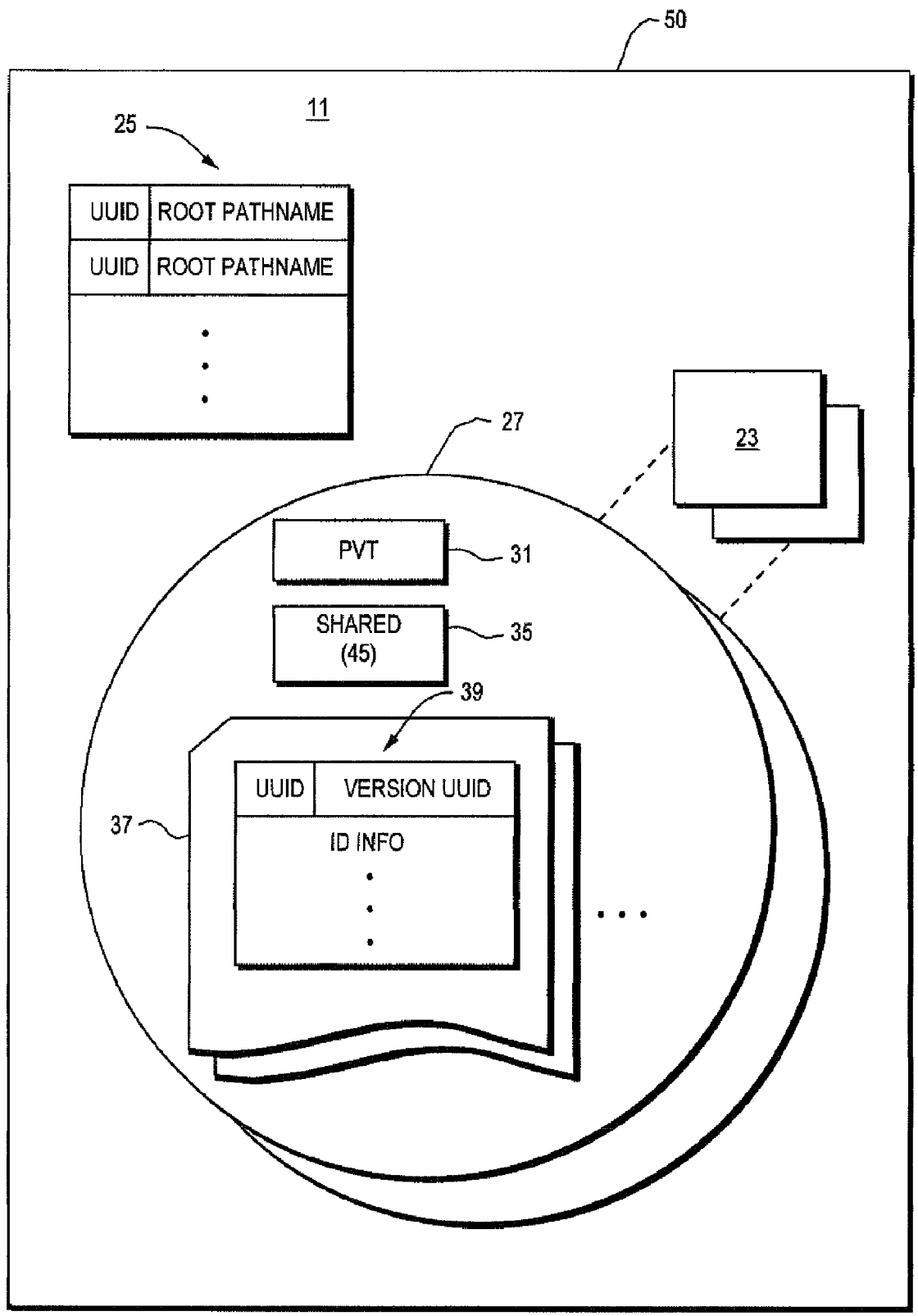

Restated, all changes to software artifacts 15, 19, 21 are made in the context of a workspace 23a, b, c (generally 23). Each developer or member of a team has a respective workspace 23 on respective client machines 50 (FIG. 1b). Each workspace 23 identifies a respective change set 33' in an accepted set 34 that indicates or provides the logical change currently being performed to a configuration 22' of that workspace.

A team repository 100 holds immutable (unchangeable) versions of files and folders created by respective developers checking in any shared files and folders they have changed in respective file areas 27 (FIG. 1b) of their workspace 23. The team repository 100 also provides the checked-in state of files of developers' workspaces 23.

With reference to the client side 50 (FIG. 1b) of the invention configuration management system 11, a workspace registry 25 is maintained on each client machine 50 containing entries for each workspace 23 that has a file area 27 in that machine 50. Each entry contains the UUID of the workspace 23 and the pathname to the root folder of the file area 27 of that workspace 23. A copy of the workspace registry 25 of each client machine 50 is maintained in the team repository 100 (FIG. 1a).

The file area 27 holds shared files 35 (shared with other team member developers) and private files 31 (available only in that file area 27). In each folder 37 in the file area 27 of a workspace 23, a special UUID-file 39 is maintained with the UUID of each member (file or folder) of that folder 37 that has been checked-in to the team repository 100. In addition, the UUID of the Version of a checked-in file is stored, as well as easily computed identity information that can be used to identify a file or folder, such as creation date and size, is stored with the UUID. The information is stored in this form so that the UUID and Version information is not lost when standard file system operations are used to move folders 37 or rename files within a folder.

In a preferred embodiment, a reference 45 to a file or folder in a workspace 23 (i.e. file area 27 thereof) is captured as a special class of object called a WSReference.

A WSReference contains the following fields:
  IsFileAreaReference: a flag indicating whether it is a reference to the state in the file area 27 or the state in the team repository 100.
  UUID: a universally unique identifier of a file or folder
  WorkspaceUUID: a universally unique identifier of a workspace 23
  State: either a version UUID or a modification date
  Suffix; a pathname suffix for private files of the file area 27 that have no UUID The following functions are supported on such references 45. Input to a function is indicated parenthetically.
  WSReference create WSReferenceFromFilePathname (String)
Create a reference 45 to a file or folder in a workspace 23 in the file area 27 of that workspace using a pathname in the file area 27 to that file or folder (requires access to the file area).
  WSReference create WSReferenceFromRepoPathname (String)
Create a reference 45 to a file or folder in a workspace 23 in the team repository 100 using a pathname in the team repository to that file or folder (requires access to the team repository).
  String getFilePathname (WSReference)
Get the pathname in the file area 27 for a reference 45 to a file or folder (requires access to the file area).

String getRepoPathname (WSReference)
  Get the pathname in the team repository 100 for a reference 45 to a file or folder (requires access to the team repository).
WSReference getFileWSReference (WSReference)
  Create a reference 45 that identifies a file in the file area 27 (returns the input WSReference if it identifies a file in the file area).
WSReference getRepoWSReference (WSReference)
  Create a reference 45 that identifies a file in the team repository 100 (returns the input WSReference if it identifies a file in the team repository).
Boolean hasSameState (WSReference)
  Returns true of the file or folder identified by this reference 45 currently has the same state as the file or folder at the time the reference 45 was created.

These functions are implemented as follows:

WSReference get WSReferenceFromFilePathname (String)
  WSReference.IsFileAreaReference is set to TRUE.
  WSReference.WorkspaceUUID is set to the UUID of the workspace in the client registry whose root file area pathname is a prefix of the String.
  WSReference.UUID is set to the UUID of the file or folder as specified in the UUID-file of the folder in the file area that contains this file. If there is no UUID for this file in the UUID-file, the UUID of the nearest parent folder of this file is used, and the relative pathname of this file from that folder is stored in the WSReference.Suffix.
  WSReference.State is the UUID of the Version currently selected by the file or folder, as determined from the UUID-file; if no Version UUID is available (because the file has not been checked-in to the server), the modification date of the file is stored.
  WSReference.Suffix is set to the empty string, unless it has been set as described in the WSReference.UUID computation.

WSReference getWSReferenceFromRepoPathname (String)
  WSReference.IsFileAreaReference is set to FALSE.
  WSReference.WorkspaceUUID is set to the UUID of the workspace whose root folder pathname in the repository is a prefix of String.
  WSReference.UUID is set to the UUID of the file or folder whose location in the repository is specified by String.
  WSReference.State is the UUID of the Version currently selected by the file or folder.
  WSReference.Suffix is set to the empty string.

String getFilePathname (WSReference)
  The WSReference.WorkspaceUUID is used to look up a workspace entry in the client machine registry.
  If no matching workspace entry is found, the null String is returned.
  If a workspace entry is found, UUID-files in the file tree rooted at the file area root folder of the workspace are scanned for a file entry that matches WSReference.UUID.
  If no matching file entry is found, the null String is returned.
  If a matching file entry is found, the pathname to that file entry is constructed, the WSReference.Suffix is appended to the pathname, and the resulting pathname is returned.

String getRepoPathnane (WSReference)
  If WSReference.Suffix is non-empty, the null String is returned.
  The team repository is queried for a file whose UUID is WSReference.UUID in the workspace whose UUID is WSReference.WorkspaceUUID.
  If no matching file is found, the null String is returned.
  If a matching file is found, the repository pathname for that file in that workspace is constructed, and returned.

WSReference getFileWSReference (WSReference)
  If WSReference.IsFileArea is TRUE, return WSReference.
  Otherwise, a new WSReference with the same fields as the WSReference argument, except with the IsFileArea field set to TRUE, is created and returned.

WSReference getRepoWSReference (WSReference)
  If WSReference.IsFileArea is FALSE, return WSReference.
  Otherwise, a new WSReference with the same fields as the WSReference argument, except with the IsFileArea field set to FALSE, is created and returned.

Boolean hasSameState (WSReference)
  If WSReference.IsFileArea is FALSE, then inspect WSReference.State. If WSReference.State is a modification date, FALSE is returned. If WSReferenee.State is a Version, use the algorithm specified in getRepoPathname to find the entry of this WSReference in the team repository. If an entry is found, and if the UUID of the Version selected by that entry is WSReference.State, TRUE is returned; otherwise, FALSE is returned.
  If WSReference.IsFileArea is TRUE, use the algorithm specified in getFilePathname to find the entry for this WSReference in a UUID-file.
  If no such entry is found, FALSE is returned.
  If the file entry has a Version UUID and if WSReference.State is a Version UUID and if the Version UUIDs match, TRUE is returned.
  If the file entry does not have a Version UUID and if WSReference.State is a modification date and if the modification date of the file is the same as WSReference.State, TRUE is returned.
  Otherwise, FALSE is returned.

The present invention is in contrast to use of uniform references in a software configuration management system. For example, a uniform reference typically required that the client specify a workspace to dereference a uniform reference, but the layer of tie client doing the dereference often didn't have access to this information. In file present invention, a workspace registry 25 has been added to the client 50, and a workspace 23 UUID has been added to the reference 45.

As another example, uniform references were not designed to handle the double namespace resulting from both a file area 27 and a repository 100. In the present invention, a reference 45 has a flag added to indicate which namespace is to be used, and routines are provided to create corresponding references 45 into the other namespace. Thus the reference flag enables disambigutation and translation between at least the file area 27 namespace and the team repository 100 namespace and/or other namespaces.

Further, uniform references did not provide a mechanism for determining whether the state of a checked-out file has changed, while references 45 in the present invention do.

Lastly, uniform references did not provide a good mechanism to refer to private files 31 in a file area 27 that have not been checked-in to the team repository 100, while the present invention references 45 do.

Further, the present invention references 45 are usable either in the local workspaces 23 or on the server 60, even when the machine (client 50) containing the local workspace 23 is disconnected from the server 60.

Figure 2:
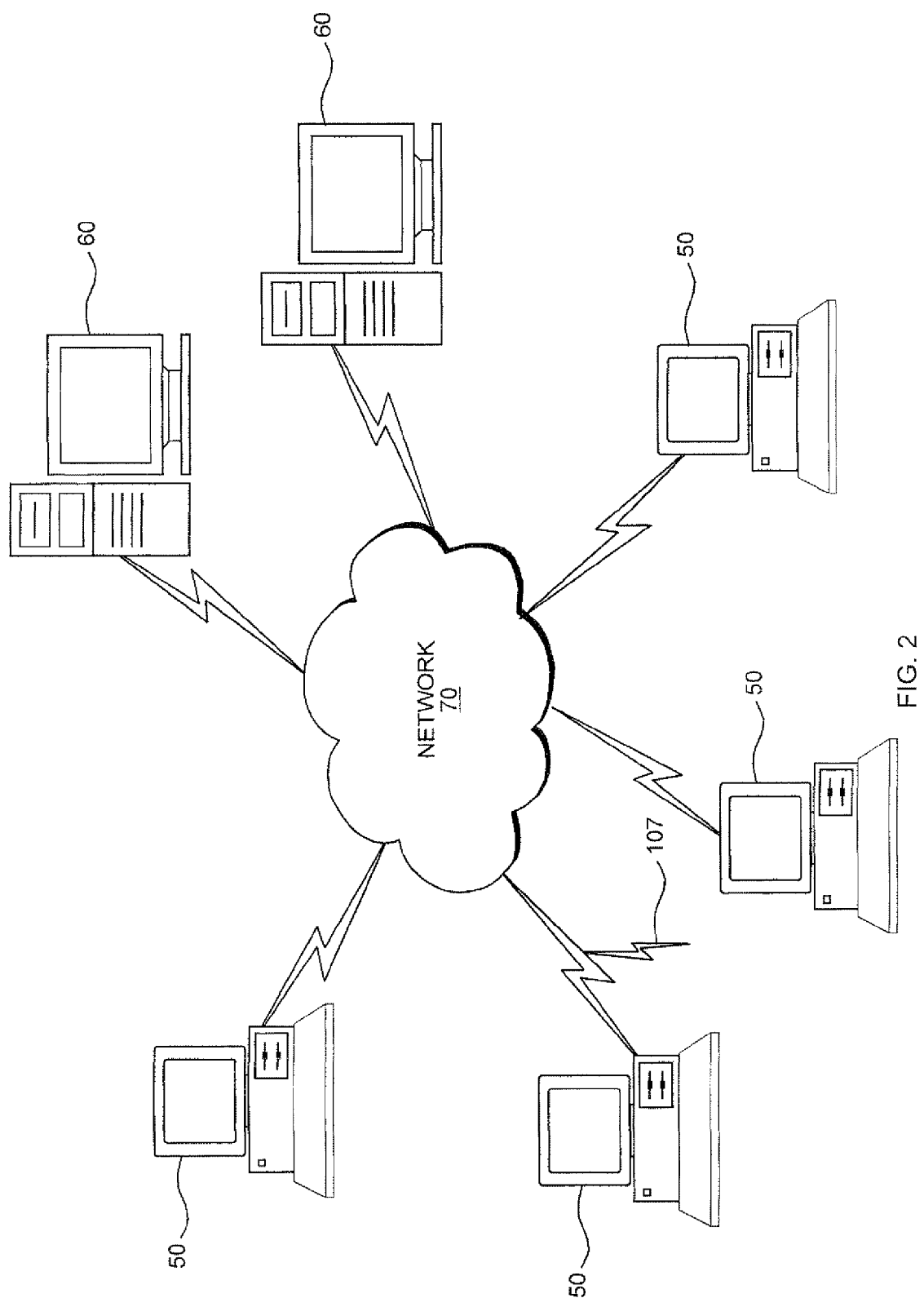
FIG. 2 is a schematic view of a computer network environment in which embodiments of the present invention operate.

FIG. 2 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
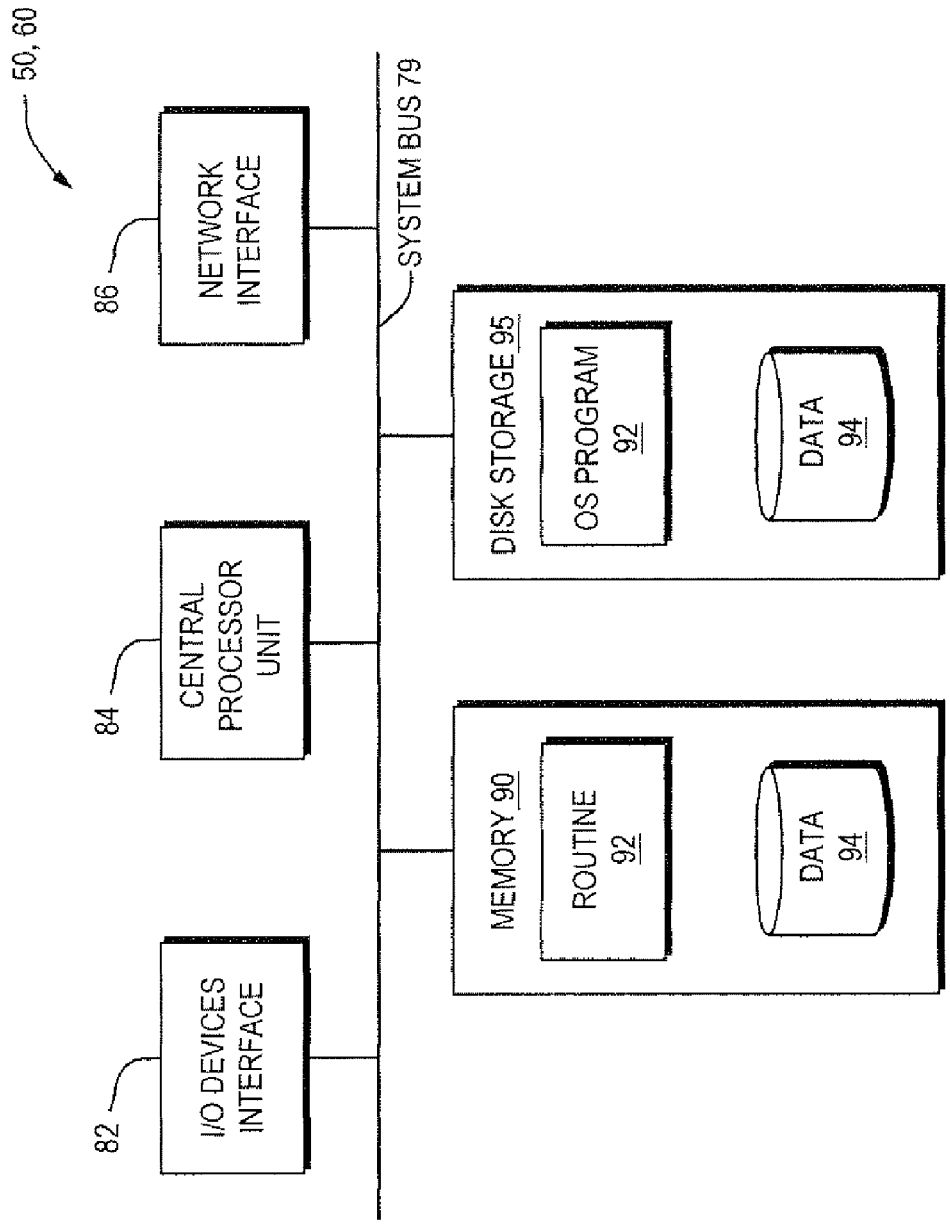
FIG. 3 is a block diagram of a computer node in the network of FIG. 2.

FIG. 3 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention. (e.g., team repository 100, workspace registry 25, workspaces 23, file areas 27 and file references 45 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes. tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

What is claimed is:

1. A software configuration management system comprising:

a processor;

a respective workspace for each developer, each workspace (i) defining a subject software configuration as being developed by the respective developer, and (ii) having a respective file area holding at least shared files corresponding to the subject software configuration; and a team repository holding immutable versions of shared files resulting from developers' respective workspaces and having been checked-in; wherein the team repository further provides state of checked-in files of developer workspaces;

wherein the file area of a developer workspace further includes at least one folder holding respective files of the file area, each folder maintaining an ID file, the ID file indicating a universally unique identifier of at least each file of the folder which has been checked in to the team repository;

the team repository is on a server and the developer workspaces are on respective clients; and each client having a workspace registry indicating the workspaces with file areas on that client.

2. A system as claimed in claim 1 further comprising a reference for indicating files with respect to both file areas of developer workspaces and the team repository.

3. A system as claimed in claim 2 wherein the reference employs a flag to enable disambiguation and translation between at least file area namespace and team repository namespace.

4. A system as claimed in claim 1 wherein the file areas of developer workspaces further hold private files.

5. A computer method for managing software configurations, comprising the steps of:
on respective client computers, providing a respective workspace for each developer, each workspace (i) defining a subject software configuration as being developed by the respective developer, and (ii) having a respective file area holding at least shared files corresponding to the subject software configuration; and on a server computer, holding immutable versions of checked-in shared flies resulting from developers' respective workspaces;

further comprising on the server computer, providing state of checked-in files of developer workspaces;

for each client computer, indicating the workspaces with file areas on that client;

for each file area indicating a universally unique identifier of at least each file of the file area which has been checked-in on the server computer; and each client having a workspace registry indicating the workspaces with file areas on that client.

6. A method as claimed in claim 5 further comprising employing file references that indicate files with respect to both file areas of developer workspaces and the server computer.

7. A method as claimed in claim 6 wherein each file reference employs a flag to enable disambiguation and translation between different namespaces.

8. A method as claimed in claim 5 wherein the file areas of developer workspaces further hold private files.

9. Computer apparatus with a computer storage medium for managing software configurations, comprising:
workspace means for defining per developer a subject software configuration as being developed by the respective developer;

file area means per developer software configuration providing a respective file area holding at least shared files corresponding to the subject software configuration; and team repository means for holding immutable versions of checked-in shared files resulting from. developers' respective workspaces;

wherein the team repository means further provides state of checked-in files of developer workspaces; and for each file area, identifier means for universally uniquely identifying at least each file of the file area that has been checked-in to the team repository means; and each client having a workspace registry indicating the workspaces with file areas on that client.

10. Apparatus as claimed in claim 9 further comprising file reference means for indicating files with respect to at least both namespace of file areas and namespace of the team repository means.

11. Apparatus as claimed in claim 10 wherein the file reference means employs a flag to enable disambiguation and translation between file area namespace and team repository namespace.

12. A computer program product comprising a computer storage medium having a computer readable program, wherein the computer readable program when executed on a computer causes the computer to:
provide a respective workspace for each developer, each workspace (i) defining a subject software configuration as being developed by the respective developer, and (ii) having a respective file area holding any combination of shared files and private files corresponding to the subject software configuration;

hold in a team repository immutable versions of checked-in shared files resulting from developers' respective workspaces; and reference files with respect to both file areas of developer workspaces and the team repository; wherein the team repository further provides state of checked-in files of developer workspaces;

wherein the file area of a developer workspace further includes at least one folder holding respective files of the file area, each folder maintaining an ID file, the ID file indicating a universally unique identifier of at least each file of the folder which has been checked in to the team repository;

the team repository is on a server and the developer workspaces are on respective clients; and each client having a workspace registry indicating the workspaces with file areas on that client.

* * * * *